United States Patent
Bae et al.

(10) Patent No.: US 11,430,988 B2
(45) Date of Patent: Aug. 30, 2022

(54) ELECTRODE AND SECONDARY BATTERY INCLUDING THE SAME

(71) Applicant: SAMSUNG SDI CO., LTD., Yongin-si (KR)

(72) Inventors: Juhye Bae, Yongin-si (KR); Hoon Seok, Yongin-si (KR); Wongi Ahn, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 113 days.

(21) Appl. No.: 16/807,447

(22) Filed: Mar. 3, 2020

(65) Prior Publication Data

US 2020/0295360 A1    Sep. 17, 2020

(30) Foreign Application Priority Data

Mar. 14, 2019 (KR) .................. 10-2019-0029366

(51) Int. Cl.
*H01M 4/36* (2006.01)
*H01M 10/0525* (2010.01)
*H01M 4/13* (2010.01)
*H01M 4/02* (2006.01)

(52) U.S. Cl.
CPC ............. *H01M 4/366* (2013.01); *H01M 4/13* (2013.01); *H01M 10/0525* (2013.01); *H01M 2004/021* (2013.01); *H01M 2220/30* (2013.01)

(58) Field of Classification Search
None
See application file for complete search history.

(56) References Cited

U.S. PATENT DOCUMENTS

| 8,530,081 B2 | 9/2013 | Hayashida et al. |
| 8,771,874 B2 | 7/2014 | Yamamoto et al. |
| 10,797,305 B2 | 10/2020 | Kim |
| 2018/0337396 A1* | 11/2018 | Kim ............. H01M 4/366 |

FOREIGN PATENT DOCUMENTS

| JP | 2004-079370 A | 3/2004 |
| KR | 10-2005-0000381 A | 1/2005 |
| KR | 10-2006-0027254 A | 3/2006 |
| KR | 10-2009-0109577 A | 10/2009 |
| KR | 10-2014-0137660 A | 12/2014 |
| KR | 10-2015-0082958 A | 7/2015 |
| KR | 10-2017-0107921 A | 9/2017 |

OTHER PUBLICATIONS

Machine Translation of KR20140137660 (Year: 2014).*
Korean Office Action dated Jul. 21, 2021.
Korean Notice of Allowance dated Jan. 25, 2022.

* cited by examiner

*Primary Examiner* — Wyatt P McConnell
(74) *Attorney, Agent, or Firm* — Lee IP Law, P.C.

(57) ABSTRACT

An electrode and a secondary battery, the electrode including a conductive substrate; and a plurality of active material layers on the conductive substrate, wherein the plurality of active material layers includes a first active material layer and a second active material layer; the first active material layer is on the substrate, the second active material layer is on the first active material layer; the first active material layer includes a first active material and a first binder; the second active material includes a second active material and a second binder; the first active material layer or the second active material layer includes convex portions and concave portions, and the concave portions have a triangular cross section or a trapezoidal cross section.

13 Claims, 17 Drawing Sheets

ELECTRODE AND SECONDARY BATTERY INCLUDING THE SAME

CROSS-REFERENCE TO RELATED APPLICATION

Korean Patent Application No. 10-2019-029366, filed on Mar. 14, 2019, in the Korean Intellectual Property Office, and entitled: "Electrode and Secondary Battery Including the Same," is incorporated by reference herein in its entirety.

BACKGROUND

1. Field

One or more embodiments relate to an electrode and a secondary battery including the same.

2. Description of Related Art

Lithium secondary batteries are used as power sources for driving portable electronic appliances such as video cameras, mobile phones, and notebook computers. Rechargeable lithium secondary batteries have three times higher energy density per unit weight than known lead batteries, nickel-cadmium batteries, nickel metal hydride batteries, and nickel-zinc batteries, and may be charged at high speed.

A lithium secondary battery produces electrical energy by oxidation and reduction reactions occurring when lithium ions are intercalated/desorbed in a state of charging an electrolyte between a cathode and an anode including active materials capable of intercalating and desorbing lithium ions.

SUMMARY

The embodiments may be realized by providing an electrode including a conductive substrate; and a plurality of active material layers on the conductive substrate, wherein the plurality of active material layers includes a first active material layer and a second active material layer; the first active material layer is on the substrate, the second active material layer is on the first active material layer; the first active material layer includes a first active material and a first binder; the second active material includes a second active material and a second binder; the first active material layer or the second active material layer includes convex portions and concave portions, and the concave portions have a triangular cross section or a trapezoidal cross section.

The substrate may directly contact the first active material layer.

The first active material layer may directly contact the second active material layer.

The convex portions and the concave portions may be between the first active material layer and the second active material layer.

The first active material layer may be completely covered by the second active material layer.

The first active material layer may include the convex portions, and the convex portions may be spaced apart from each other at intervals of about 15 μm to about 100 μm.

The plurality of active material layers may include the first binder and the second binder in an amount of about 1.0 wt % to 2.0 wt %, based on a total weight of the first active material layer and the second active material layer.

The electrode plurality of active material layers may include the first binder in an amount that is higher than an amount of the second binder.

A weight ratio of the first binder and the second binder may be 50:50 to 90:10.

The first active material may be the same as the second active material.

The first active material may be different from the second active material.

The first binder may be the same as the second binder.

The first binder may be different from the second binder.

The embodiments may be realized by providing a secondary battery including the electrode according to an embodiment.

BRIEF DESCRIPTION OF THE DRAWINGS

Features will be apparent to those of skill in the art by describing in detail exemplary embodiments with reference to the attached drawings in which.

DETAILED DESCRIPTION

Figure 1A:
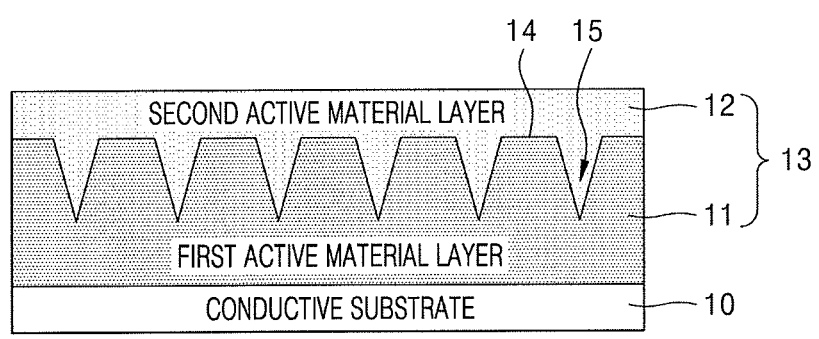
FIG. 1A illustrates a cross-sectional view of an electrode according to an embodiment of the present disclosure.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "or" and "and/or" include any and all combinations of one or more of the associated listed items. Throughout the disclosure, the expression "at least one of a, b or c" indicates only a, only b, only c, both a and b, both a and c, both b and c, all of a, b, and c, or variations thereof.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

Throughout the written description and drawings, the expression "A directly contacts B" means that the surface of A and the surface of B contact each other and no portion exists at the interface between A and B. Although the terms "first", "second", etc., may be used herein to describe various elements, components, regions, and/or layers, these elements, components, regions, and/or layers should not be limited by these terms. These terms are used only to distinguish one component from another, not for purposes of limitation. Although some of the components may be omitted in the drawings, this is to aid the understanding of features of the invention and is not intended to exclude the omitted components.

Hereinafter, electrodes, secondary batteries including the electrodes, and methods of manufacturing the electrodes according to embodiments will be described in detail.

An electrode according to an embodiment will be described with reference to FIG. 1A.

An electrode according to an embodiment may include, e.g., a conductive substrate 10; and a plurality of active material layers 13 arranged on the conductive substrate 10. The plurality of active material layers 13 may include, e.g., a first active material layer 11 and a second active material layer 12. The first active material layer 11 may be formed on the substrate 10, and the second active material layer 12 may be formed on the first active material layer 11. The first active material layer 11 may include a first active material and a first binder. The second active material 12 may include a second active material and a second binder. The first active material layer 11 or the second active material layer 12 may include a convex portion 14 and a concave portion 15. The concave portion 15 may have a triangular or trapezoidal cross section. Here, the "cross section" means a surface in the thickness direction when cut in the thickness direction of the electrode.

As used herein, for convenience of explanation, the convex portion 14 and the concave portion 15 will be described based on the first active material layer adjacent to the conductive substrate. For example, the convex portion of the first active material layer indicates a convex portion based on the first active material layer, and the convex portion of the second active material layer indicates a convex portion based on the second active material layer. Referring to FIG. 1A, the convex portion 14 of the first active material layer 11 corresponds to the concave portion of the second active material layer 12, and the concave portion 15 of the first active material layer 11 corresponds to the convex portion of the second active material layer 12. For example, the first active material layer 11 may have an intergaging, complementary shape relative to the second active material layer 12.

In the electrode including the first active material layer 11 and the second active material layer 12 on the conductive substrate 10, the content or amount of the binder may be easily adjusted as compared with an electrode including a single active material layer. In the case of the electrode including a single active material layer, in the process of drying an active material slurry, the binder may move to the interface of the active material layer by binder migration, and the content of the binder in a region adjacent to a current collector decreases, and as a result, adhesion between the current collector and the active material layer may deteriorate. This may be addressed to some extent by including a large amount of a binder in the active material slurry. However, in this case, the concentration of the binder in the interface of the active material layer increases, and thus high rate charge-discharge characteristics may deteriorate due to the increase of interfacial resistance. Accordingly, in the electrode including a single active material layer, the content of the binder may decrease in terms of high-rate charge characteristics, and thus there may be a difficulty in simultaneously achieving the improvement of both high-rate charge characteristics and adhesion.

The electrode according to an embodiment may include two or more active material layers, and a sufficient amount of the binder may be included in the first active material layer adjacent to the conductive substrate to increase adhesion between the conductive substrate and the active material layer, and the content of the binder in the second active material layer may be decreased (e.g., may be relatively lower than that of the first active material layer), thereby inhibiting an increase of interfacial resistance. The first active material layer or the second active material layer may include a convex portion and a concave portion to increase a contact area between the first active material layer and the second active material layer, and the first active material layer may be strongly bonded to the second active material layer. In addition, the first active material layer or the second active material layer may include a convex portion and a concave portion, and the electrolyte may diffuse not only in the longitudinal direction but also in the transverse direction when the electrolyte is impregnated, so that the impregnating ability of the electrode according to an embodiment is excellent, as compared with an electrode including an active material layer not having a convex portion and a concave portion. As a result, ionic conductivity may be improved to exhibit high capacity at high current density.

A secondary battery including such an electrode may have improved charge-discharge characteristics at high rate, may have excellent adhesion between a current collector and an active material layer to help improve conductivity and inhibit the detachment of the active material layer, thereby improving lifetime characteristics.

In an implementation, the concave portion may have a triangular or trapezoidal cross section, and the desorption of an active material may be inhibited, as compared with a case where the concave portion has a rectangular cross section. If the concave portion were to have a rectangular cross section, it is thought that the desorption of an active material may be increased by resistance due to fracture.

In an implementation, the concave portion may have a trapezoidal cross section, pressure at the end of the concave portion may be lowered, the impregnating ability of an electrolyte may be improved, resistance due to fracture may be reduced by the inclined edge of the concave portion, and the desorption of active material may be inhibited.

In an implementation, the conductive substrate may be a substrate capable of transferring electrons, and may include, e.g., a metal substrate. The conductive substrate may be a suitable current collector used as a cathode current collector or an anode current collector.

In an implementation, an additional layer that does not deteriorate battery characteristics may be provided between the substrate and the first active material layer or between the first active material layer and the second active material layer. For example, the additional layer may be a conductive layer or a third active material layer. The conductive layer or the third active material layer may include the same material as or a different material from the first active material layer or the second active material layer.

According to an embodiment, the substrate and the first active material layer may be in direct contact with each other.

According to another embodiment, the first active material layer and the second active material layer may be in direct contact with each other.

According to an embodiment, the convex portion and the concave portion may be provided between the first active material layer and the second active material layer.

According to an embodiment, the first active material layer may be completely covered by the second active material layer.

According to an embodiment, the convex portions of the first active material layer may be spaced apart from each other at intervals of, e.g., about 15 μm to about 100 μm. For example, the openings or mouths of the concave portions of the first active material layer may have a diameter or width of about 15 μm to about 100 μm. For example, the width of the concave portions of the first active material layer may be about 15 μm to about 100 μm. In an implementation, the width of the concave portion of the first active material layer may be, e.g., about 16 μm to about 100 μm, about 17 μm to about 100 μm, about 18 μm to about 100 μm, about 19 μm to about 100 μ, or about 20 μm to about 100 μm. Maintaining the width of the concave portion of the first active material layer at 15 μm or greater may help ensure that the resistance according to the pressure at the time of the impregnation of an electrolyte is not too high, thereby facilitating impregnation of the electrolyte with the concave portion of the first active material layer. Maintaining the width of the concave portion of the first active material layer at 100 μm or less may help prevent generation of dendrites in the concave portion of the first active material layer, which could cause an undesirable micro-short. For example, in order to ensure sufficient impregnation of the electrode without generating micro-short, the width of the concave portion of the first active material layer may be within the above range.

According to an embodiment, the total content of the first binder and the second binder may be about 1.0 wt % to 2.0 wt %, based on a total weight of the first active material layer and the second active material layer. In an implementation, the total content of the first binder and the second binder may be about 1.0 wt % to 1.5 wt % based on a total weight of the first active material layer and the second active material layer. In the above electrode, due to the aforementioned structure, the content of the binder may be remarkably reduced compared to the content of the binder in other electrodes.

In an implementation, the content of the first binder and the content of the second binder may be the same as or different from each other. In an implementation, the content of the first binder and the content of the second binder may be different from each other.

In an implementation, the content of the first binder may be higher than the content of the second binder. For example, the first active material layer and the conductive substrate may be strongly bonded to each other, and an increase in resistance due to the binder existing in the second active material layer may be inhibited. As a result, both improvement of bonding force of the active material layer to the substrate and improvement of ion conductivity may be achieved.

In an implementation, the weight ratio of the first binder and the second binder may be 50:50 to 90:10. In an implementation, the weight ratio of the first binder and the second binder may be, e.g., 50:50 to 80:20, 50:50 to 70:30, 50:50 to 65:35, or 50:50 to 60:40.

When the total content of the first binder and the second binder is within the above range, strong bonding between the first active material layer and the substrate may be achieved, an increase in interfacial resistance may be inhibited, and strong bonding between the first active material layer and the second active material layer may be achieved.

In an implementation, the first active material and the second active material may be the same as or different from each other. For example, the first active material may be the same as the second active material. When the same material is used, the amount of the binder used may be reduced as compared with a case where the active material is formed into a single layer. In an implementation, the first active material may be different from the second active material. When different active materials from each other are used, advantages of the active materials may be combined with each other, and used.

In an implementation, the first binder and the second binder may be the same as or different from each other. For example, the first binder may be the same as the second binder. As another example, the first binder may be different from the second binder.

Hereinafter, a method of manufacturing an electrode according to an embodiment will be described.

The method of manufacturing an electrode according to an embodiment may include:

forming a first active material layer including a first active material and a first binder on a conductive substrate; forming a plurality of holes having a trapezoidal cross section in the surface of the first active material layer; and forming a second active material layer including a second active material and a second binder on the first active material layer.

In an implementation, the content of the first binder and the content of the second binder may be the same as or different from each other. For example, the content of the first binder may be greater than the content of the second binder.

In an implementation, the forming of the first active material layer may include: applying a first active material slurry including the first active material and the first binder on the conductive substrate and drying the first active material slurry.

In an implementation, the forming of the second active material layer may include: applying a second active material slurry including the second active material and the second binder on the conductive substrate and drying the second active material slurry.

The first active material slurry may further include a first solvent, and the second active material slurry may further include a second solvent.

The first solvent and the second solvent include an organic solvent, water, or a combination thereof. The first solvent and the second solvent may each independently be, e.g., an organic solvent such as N-methyl pyrrolidone, dimethyl formamide, acetone, or dimethyl acetamide; water; or a combination thereof In the forming of the first active material layer and the forming of the second active material layer, the drying process may be selectively performed at 70° C. to 120° C. for 4 minutes to 15 minutes. In an implementation, the drying process may be performed at 70° C. to 110° C. for 4 minutes to 10 minutes. A suitable drying process under the condition of selectively drying a solvent without deteriorating an active material may be performed.

The forming of the first active material layer may further include a pressing process after the drying process.

The forming of the second active material layer may further include a pressing process after the drying process.

The concave portion having a triangular or trapezoidal cross section may be manufactured by using a suitable method such as dry or wet etching or laser etching the first active material layer.

The convex portion and the concave portion may be provided between a first active material layer and a second active material layer.

Another embodiment may include a secondary battery including the aforementioned electrode. The secondary battery may include, e.g., a lithium secondary battery, a sodium secondary battery, or another battery capable of repeatedly providing electricity by charging and discharging.

For example, the secondary battery may include a cathode and an anode, and at least one of the cathode and the anode may include the electrode according to an embodiment of the present disclosure.

For example, the secondary battery may be manufactured by the following method.

First, a cathode may be prepared.

For example, a cathode active material composition in which a cathode active material, a conductive material, a binder, and a solvent are mixed may be prepared. A cathode plate may be prepared by coating a metal current collector with the cathode active material composition. Alternatively, the cathode plate may be prepared by casting the cathode active material composition onto a separate support, separating a film from the support and then laminating the separated film on a metal current collector.

The cathode active material may be a suitable active material, e.g., a lithium-containing metal oxide. As the lithium-containing metal oxide, for example, two or more kinds of composite oxides of lithium and a metal selected from cobalt, manganese, nickel, and combinations thereof may be used. As the lithium-containing metal oxide, for example, a compound represented by any one of Formulae of $Li_aA_{1-b}B^1{}_bD^1{}_2$(where, $0.90 \leq a \leq 1.8$, and $0 \leq b \leq 0.5$ are satisfied); $Li_aE_{1-b}B^1{}_bO_{2-c}D^1{}_c$ (where, $0.90 \leq a \leq 1.8$, $0 \leq b \leq 0.5$, and $0 \leq c \leq 0.05$ are satisfied); $LiE_{2-b}B^1{}_bO_{4-c}D^1{}_c$(where, $0 \leq b \leq 0.5$ and $0 \leq c \leq 0.05$ are satisfied); $Li_aNi_{1-b-c}Co_bB^1{}_cD^1{}_\alpha$ (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Co_bB^1{}_cO_{2-\alpha}F^1{}_\alpha$(where, $0.90 \leq a \leq 1.8$, $0 \leq b \leq 0.5$, $0 \leq c \leq 0.05$, and $0 < \alpha < 2$ are satisfied); $Li_aNi_{1-b-c}Co_bB^1{}_cO_{2-\alpha}F^1{}_2$(where, $0.90 \leq a \leq 1.8$, $0 \leq b \leq 0.5$, $0 \leq c \leq 0.05$, and $0 < a < 2$ are satisfied); $Li_aNi_{1-b-c}Mn_bB^1{}_cD^1{}_\alpha$ (where, $0.90 \leq a \leq 1.8$, $0 \leq b \leq 0.5$, $0 \leq c \leq 0.05$, and $0 < \alpha \leq 2$ are satisfied); $Li_aNi_{1-b-c}Mn_bB^1{}_cO_{2-\alpha}F^1{}_\alpha$(where, $0.90 \leq a \leq 1.8$, $0 \leq b \leq 0.5$, $0 \leq c \leq 0.05$, and $0 < a < 2$ are satisfied); $Li_aNi_{1-b-c}Mn_bB^1{}_cO_2$. $_\alpha F^1{}_2$(where, $0.90 \leq a \leq 1.8$, $0 \leq b \leq 0.5$, $0 \leq c \leq 0.05$, and $0 < \alpha < 2$ are satisfied); $Li_aNi_bE_cG_dO_2$(where, $0.90 \leq a \leq 1.8$, $0 \leq b \leq 0.9$, $0 \leq c \leq 0.5$, and $0.001 \leq d \leq 0.1$ satisfied); $Li_aNi_bCo_cMn_dGeO_2$(where, $0.90 \leq a \leq 1.8$, $0 \leq b \leq 0.9$, $0 \leq c \leq 0.5$, $0 \leq d \leq 0.5$, and $0.001 \leq e \leq 0.1$ are satisfied);$Li_aNiG_bO_2$(where, $0.90 \leq a \leq 1.8$ and $0.001 \leq b \leq 0.1$ are satisfied);$Li_aCoG_bO_2$ (where, $0.90 \leq a \leq 1.8$ and $0.001 \leq b \leq 0.1$ are satisfied); $Li_aMnG_bO_2$(where, $0.90 \leq a \leq 1.8$ and $0.001 \leq b \leq 0.1$ are satisfied);$Li_aMn_2G_bO_4$(where, $0.90 \leq a \leq 1.8$ and $0.001 \leq b \leq 0.1$ are satisfied);$QO_2$; $QS_2$; $LiQS_2$; $V_2O_5$; $LiV_2O_5$; $LiI^1O_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$ may be used.

In the Formulae above, A may be Ni, Co, Mn, or a combination thereof; $B^1$ may be Al, Ni, Co, Mn, Cr, Fe, Mg, Sr, V, a rare earth element, or a combination thereof; $D^1$ may be O, F, S, P, or a combination thereof; E may be Co, Mn, or a combination thereof; $F^1$ may be F, S, P, or a combination thereof; G may be Al, Cr, Mn, Fe, Mg, La, Ce, Sr, V, or a combination thereof; Q may be Ti, Mo, Mn, or a combination thereof; $I^1$ may be Cr, V, Fe, Sc, Y, or a combination thereof; and J may be V, Cr, Mn, Co, Ni, Cu, or a combination thereof.

For example, the lithium-containing metal oxide may be $LiCoO_2$, $LiMn_xO_{2x}$, (x=1, 2), $LiNi_{1-x}Mn_xO_{2x}(0<x<1)$, $LiNi_{1-x-y}Co_xMn_yO_2(0 \leq x \leq 0.5, 0 \leq y \leq 0.5)$, or $LiFePO_4$.

In an implementation, a compound having a coating layer on the surface of the compound may be used, or a mixture of the compound and a compound having a coating layer may be used. The coating layer may include a coating element compound of an oxide of a coating element, a hydroxide of a coating element, an oxyhydroxide of a coating element, an oxycarbonate of a coating element, or a hydroxycarbonate of a coating element. The compound constituting this coating layer may be amorphous or crystalline. As the coating element included in the coating layer, Mg, Al, Co, K, Na, Ca, Si, Ti, V, Sn, Ge, Ga, B, As, Zr, or a mixture thereof may be used. In the process of forming the coating layer, any coating method may be used as long as this compound may be coated with such elements by a method that does not adversely affect the physical properties of the cathode active material (for example, spray coating, dipping or the like). This coating method will be understood by those skilled in the art, so that a detailed description thereof will be omitted.

In an implementation, the conductive material may include, e.g., carbon black, graphite fine particles, or the like.

In an implementation, the binder may include, e.g., a vinylidene fluoride/hexafluoropropylene copolymer, polyvinylidene fluoride (PVDF), polyacrylonitrile, polymethylmethacrylate, polytetrafluoroethylene and mixtures thereof, or a styrene butadiene rubber polymer.

In an implementation, the solvent may include, e.g., N-methylpyrrolidone, acetone, water, or the like.

The content of the cathode active material, the content of the conductive material, the content of the binder, and the content of the solvent are levels suitable used in a lithium secondary battery. The content of the binder may be as described above.

When the cathode includes an electrode according to an aspect of the present disclosure, the cathode may be prepared as a cathode including double active material layers using the first cathode active material composition and the second cathode active material composition.

Next, an anode may be prepared.

For example, an anode active material composition in which an anode active material, a conductive material, a binder, and a solvent are mixed may be prepared. An anode plate may be prepared by directly coating a metal current collector with the anode active material composition and drying the anode active material composition. Alternatively, the anode plate may be prepared by casting the anode active material composition onto a separate support, separating a film from the support and then laminating the separated film on a metal current collector.

The anode active material may be a suitable active material for a lithium battery. For example, the anode active material may include a lithium metal, a metal alloyable with lithium, a transition metal oxide, a non-transition metal oxide, or a carbon material.

For example, the metal alloyable with lithium may be Si, Sn, Al, Ge, Pb, Bi, Sb, a Si—Y' alloy (Y' may be an alkaline metal, an alkaline earth metal, a group 13 element, a group 14 element, a transition metal, or a combination thereof, not Si), or a Sn—Y' alloy (Y' may be an alkaline metal, an alkaline earth metal, a group 13 element, a group 14 element, a transition metal, or a combination thereof, not Sn). The element Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, or Te.

For example, the transition metal oxide may be lithium titanium oxide, vanadium oxide, lithium vanadium oxide, or the like.

For example, the non-transition metal oxide may be $SnO_2$, $SiO_x(0<x<2)$, or the like.

The carbon material may be crystalline carbon, amorphous carbon, or a mixture thereof. The crystalline carbon may be graphite such as natural graphite or artificial graphite of an amorphous, plate-like, flake-like, spherical or fibrous form. The amorphous carbon may be soft carbon (low-temperature fired carbon), hard carbon, mesophase pitch carbide, or fired coke.

The conductive material, binder, and solvent in the anode active material composition may be the same as those in the cathode active material composition.

The content of the anode active material, the content of the conductive material, the content of the binder, and the content of the solvent may be levels suitably used in the lithium secondary battery. The content of the binder is as described above.

When the anode includes an electrode according to an aspect of the present disclosure, the anode may be prepared as an anode including double active material layers using the first anode active material composition and the second anode active material composition.

Next, a separator to be inserted between the anode and the cathode may be prepared.

The separator may be a suitable separator for a lithium battery. A separator having low resistance to the movement of ions in the electrolyte and superior in electrolyte wettability may be used. For example, the separator may include glass fiber, polyester, Teflon, polyethylene, polypropylene, polytetrafluoroethylene (PTFE), or combinations thereof, and may be made in the form of nonwoven fabric or woven fabric. For example, a windable separator including polyethylene, polypropylene, or the like may be used in a lithium ion battery, and a separator having good electrolyte impregnation ability may be used in a Lithium ion polymer battery. For example, the separator may be manufactured by the following method.

A polymer resin, a filler, and a solvent may be mixed to prepare a separator composition. The separator composition may be directly applied on an electrode and dried to form a separator. Alternatively, the separator composition may be cast on a support and dried, a separation film may be separated from the support, and then the separation film may be laminated on the electrode to form a separator.

The polymer resin may be a suitable material for the manufacture of the separator. For example, the polymer resin may include a vinylidene fluoride/hexafluoropropylene copolymer, polyvinylidene fluoride (PVDF), polyacrylonitrile, polymethyl methacrylate, or a mixture thereof.

Next, an electrolyte may be prepared.

For example, the electrolyte may be an organic electrolyte. The electrolyte may be a solid electrolyte. For example, the solid electrolyte may be boron oxide, lithium oxynitride, or the like. A suitable solid electrolyte may be used. The solid electrolyte may be formed on the cathode by sputtering or the like.

For example, the organic electrolyte may be prepared by dissolving lithium salt in an organic solvent.

In an implementation, the organic solvent may be, e.g., propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl iso propyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N, N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether, or a mixture thereof.

In an implementation, the lithium salt may be, e.g., $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (in which x and y are natural numbers), LiCl, LiI, or a mixture thereof.

Figure 10:
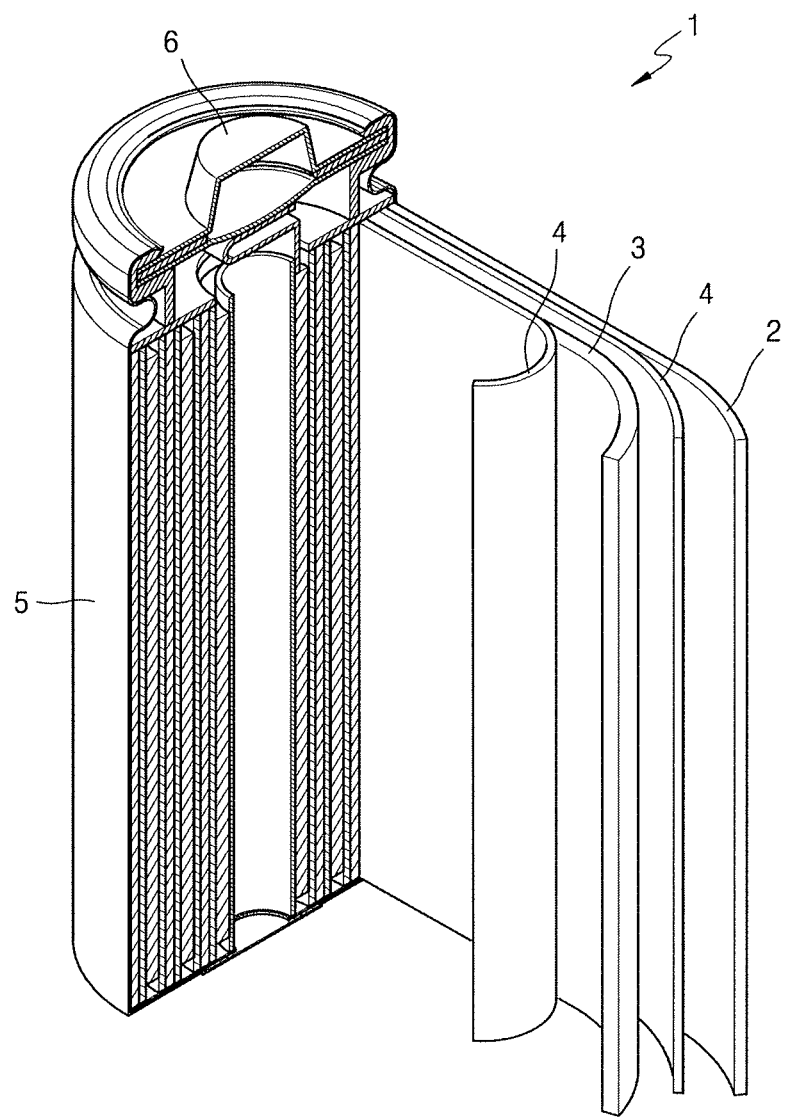
FIG. 10 illustrates a schematic view of the structure of a lithium secondary battery according to an embodiment.

As shown in FIG. 10, the lithium secondary battery 1 may include a cathode 3, an anode 2, and a separator 4. The anode 3, the cathode 2, and the separator 4 may be wound or folded and accommodated in a battery case 5. Then, an organic electrolyte may be injected into the battery case 5, and the battery case 5 may be sealed with a cap assembly 6 to complete the manufacture of the lithium secondary battery 1. The battery case 5 may have a cylindrical shape, a rectangular shape, or a thin film shape. For example, the lithium secondary battery 1 may be a thin-film battery. The lithium secondary battery 1 may be a lithium ion battery.

The separator 4 may be between the anode 3 and the cathode 2 to form a battery structure. The battery structure may be laminated as a bi-cell structure and then impregnated with an organic electrolyte, and the resulting product is accommodated in a pouch and sealed to complete a lithium ion polymer battery.

In an implementation, the plurality of battery structures may be laminated to form a battery pack, and this battery pack may be used in appliances requiring high capacity and high power. For example, the battery pack may be used in notebooks, smart phones, electric vehicles, and the like.

The lithium secondary battery may be used in an electric vehicle (EV) because of its excellent life characteristics and high rate characteristics. For example, the lithium secondary battery may be used in hybrid vehicles such as plug-in hybrid electric vehicles (PHEV). In an implementation, the lithium secondary battery may be used in applications where a large amount of power storage is required. For example, the lithium secondary battery may be used in electric bicycles, power tools, and the like.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

(Manufacture of Electrode)

PREPARATION EXAMPLE 1

(Preparation of Active Material Slurry)

Artificial graphite and natural graphite were dry-mixed at a weight ratio of 8:2, 0.8 wt % of a 1% carboxymethyl cellulose solution was additionally mixed to obtain a mixed solution, and the mixed solution was stirred for 10 minutes using a mechanical stirrer (Thinky mixer). Then, 1.5 wt % of styrene-butadiene rubber (SBR), as a binder, was put into the mechanical stirrer, and stirred for 10 minutes to prepare an active material slurry.

(Manufacture of Electrode)

Figure 1B:
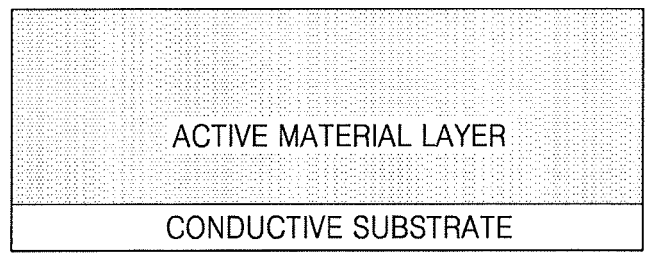
FIG. 1B illustrates a cross-sectional view of the electrode of Preparation Example 1.

The active material slurry was applied onto a copper current collector having a thickness of 10 μm to a thickness of about 150 μm using a doctor blade, dried at 110° C. for 10 minutes using a hot air dryer, and then roll-pressed to prepare an anode plate having a density of 1.6 g/cc. The cross section of this electrode is shown in FIG. 1B.

PREPARATION EXAMPLE 2

(Preparation of First Active Material Slurry)

Artificial graphite and natural graphite were dry-mixed at a weight ratio of 8:2, 0.8 wt % of a 1% carboxymethyl cellulose solution was additionally mixed to obtain a mixed solution, and the mixed solution was stirred for 10 minutes using a mechanical stirrer (Thinky mixer). Then, 2.1 wt % of styrene-butadiene rubber (SBR), as a binder, was put into the mechanical stirrer, and stirred for 10 minutes to prepare a first active material slurry.

(Preparation of Second Active Material Slurry)

Artificial graphite and natural graphite were dry-mixed at a weight ratio of 8:2, 0.8 wt % of a 1% carboxymethyl cellulose solution was additionally mixed to obtain a mixed solution, and the mixed solution was stirred for 10 minutes using a mechanical stirrer (Thinky mixer). Then, 0.9 wt % of styrene-butadiene rubber (SBR), as a binder, was put into the mechanical stirrer, and stirred for 10 minutes to prepare a second active material slurry.

(Manufacture of Electrode)

Figure 2A:
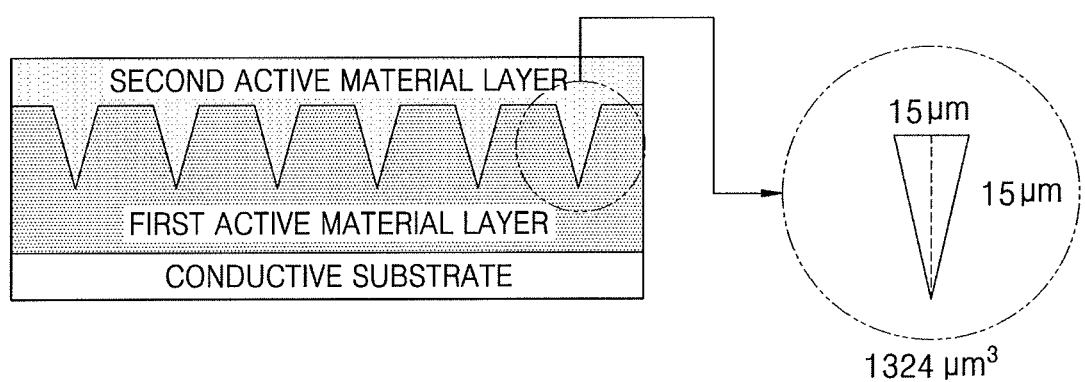
FIGS. 2A to 2C illustrate schematic cross-sectional views of electrodes of Preparation Examples 2 to 4.

The first active material slurry was applied onto a 10 μm thick copper current collector to a thickness of about 75 μm using a doctor blade, dried at 110° C. for 10 minutes using a hot air dryer to form a first active material layer. Then, the first active material layer was etched in a stamp manner using a micro pin having a conical shape of 15 μm in diameter (e.g., at its base) and 15 μm in height. Subsequently, the second active material slurry was applied onto the first active material slurry to a thickness of about 75 μm using a doctor blade, dried at 110° C. for 10 minutes using a hot air dryer, and then roll-pressed to prepare an anode plate having a density of 1.6 g/cc. In this case, the total content of the binder included in the first active material layer and the second active material layer was 1.5 wt % based on the total weight of the first active material layer and the second active material layer. The cross section of this electrode is shown in FIG. 2A.

PREPARATION EXAMPLE 3

Figure 2B:
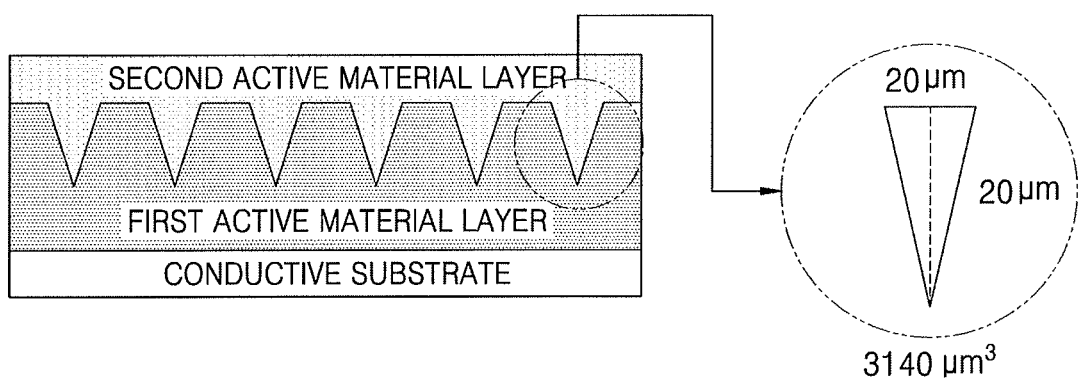

An electrode was manufactured in the same manner as in Preparation Example 2, except that the first active material layer was etched in a stamp manner using a micro pin having a conical shape of 20 μm in diameter and 20 μm in height. The cross section of this electrode is shown in FIG. 2B.

PREPARATION EXAMPLE 4

Figure 2C:
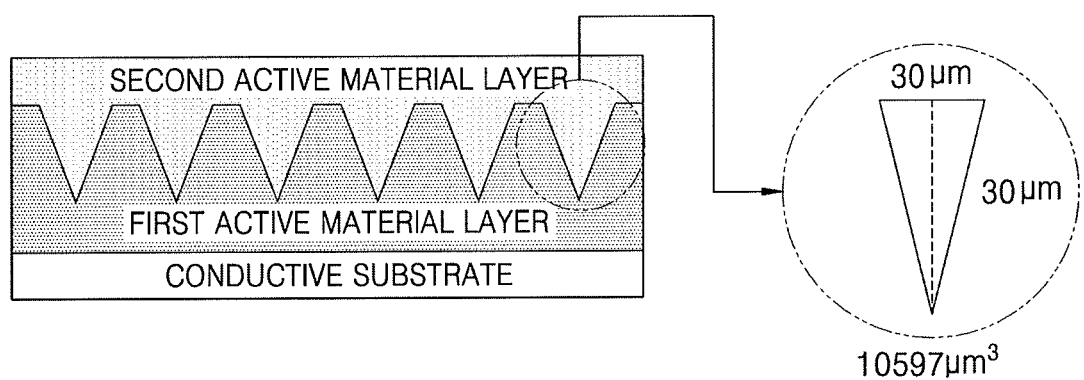

An electrode was manufactured in the same manner as in Preparation Example 2, except that the first active material layer was etched in a stamp manner using a micro pin having a conical shape of 30 μm in diameter and 30 μm in height. The cross section of this electrode is shown in FIG. 2C.

PREPARATION EXAMPLE 5

Figure 3A:
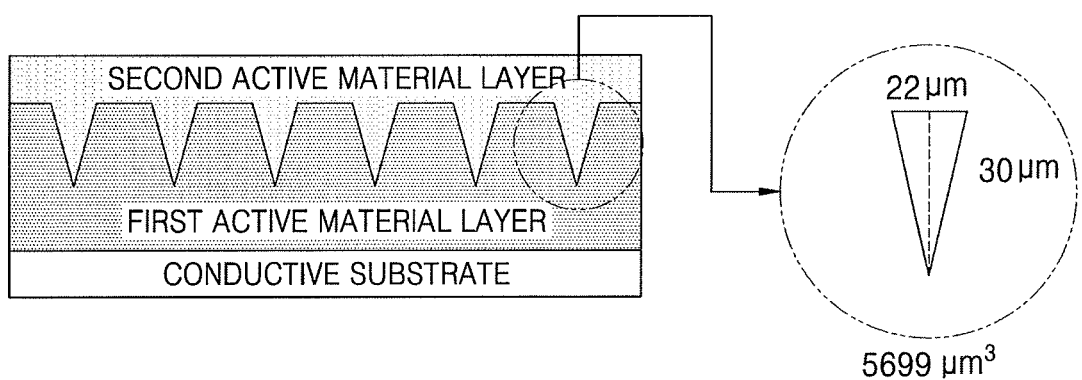
FIGS. 3A to 3E illustrate schematic cross-sectional views of the electrodes of Preparation Examples 5 to 9.

An electrode was manufactured in the same manner as in Preparation Example 2, except that the first active material layer was etched in a stamp manner using a micro pin having a conical shape of 22 μm in diameter and 30 μm in height. The cross section of this electrode is shown in FIG. 3A.

PREPARATION EXAMPLE 6

Figure 3B:
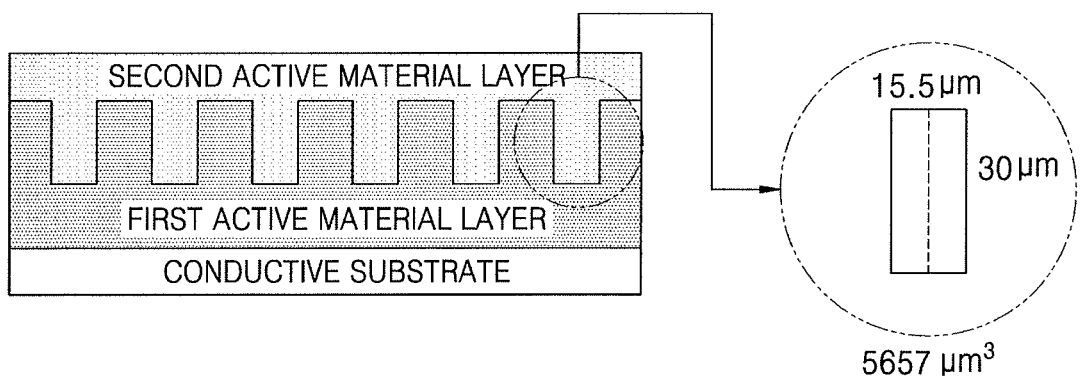

An electrode was manufactured in the same manner as in Preparation Example 2, except that the first active material layer was etched in a stamp manner using a micro pin having a cylindrical shape of 15.5 μm in diameter and 30 μm in height. The cross section of this electrode is shown in FIG. 3B.

PREPARATION EXAMPLE 7

Figure 3C:
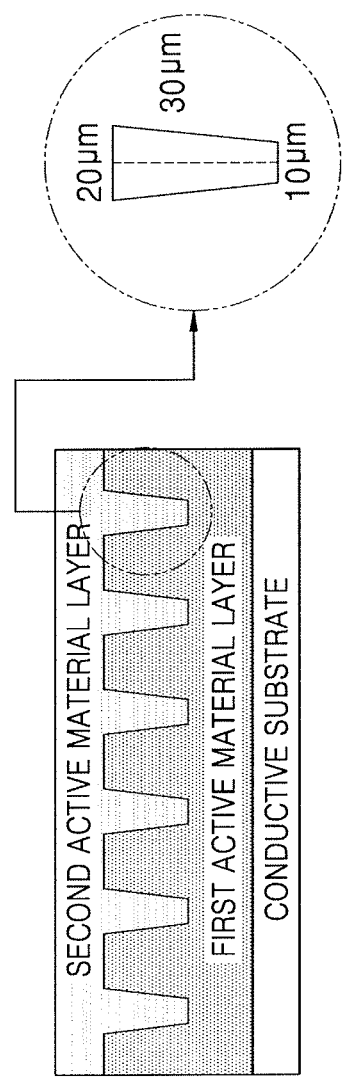

An electrode was manufactured in the same manner as in Preparation Example 2, except that the first active material layer was etched in a stamp manner using a micro pin having a truncated conical shape of a bottom surface of 20 μm in diameter, a top surface of 10 μm in diameter and 30 μm in height. The cross section of this electrode is shown in FIG. 3C.

PREPARATION EXAMPLE 8

Figure 3D:
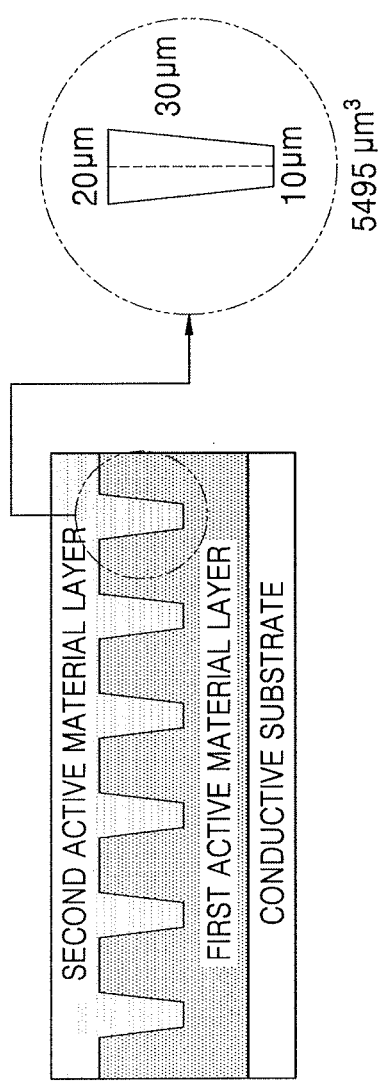

An electrode was manufactured in the same manner as in Preparation Example 2, except that 1.5 wt % of the binder was included in the first active material layer, 1.5 wt % of the binder was included in the second active material layer, and the first active material layer was etched in a stamp manner using a micro pin having a truncated conical shape of a bottom surface of 20 μm in diameter, a top surface of 10 μm in diameter and 30 μm in height. The cross section of this electrode is shown in FIG. 3D.

PREPARATION EXAMPLE 9

Figure 3E:
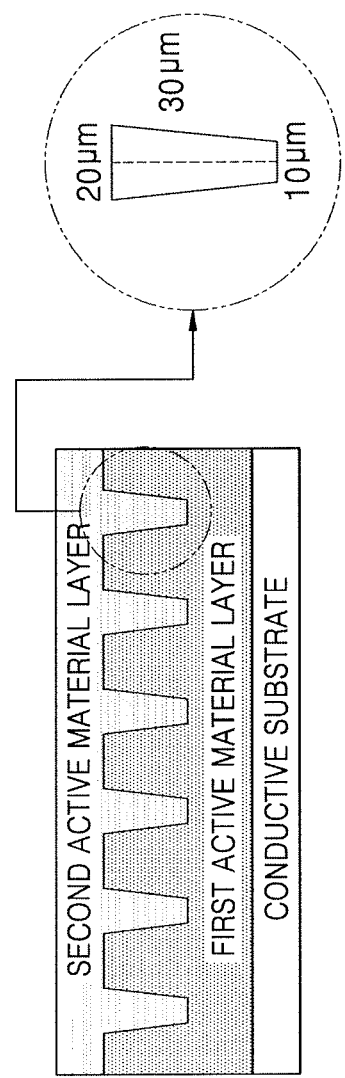

An electrode was manufactured in the same manner as in Preparation Example 2, except that 2.7 wt % of the binder was included in the first active material layer, 0.3 wt % of the binder was included in the second active material layer, and the first active material layer was etched in a stamp manner using a micro pin having a truncated conical shape of a bottom surface of 20 μm in diameter, a top surface of 10 μm in diameter and 30 μm in height. The cross section of this electrode is shown in FIG. 3E.

(Evaluation of Characteristics According to the Width of the Concave Portion of the First Active Material Layer)

(1) Evaluation of Impregnation Rate

After each of the electrodes manufactured in Preparation Examples 1 to 4 was impregnated with an electrolyte, a change in weight between after and before the impregnation of the electrolyte was measured, and the impregnation rate (%) of the electrolyte in the electrode was calculated. The results thereof are shown in FIG. 4.

Figure 4:
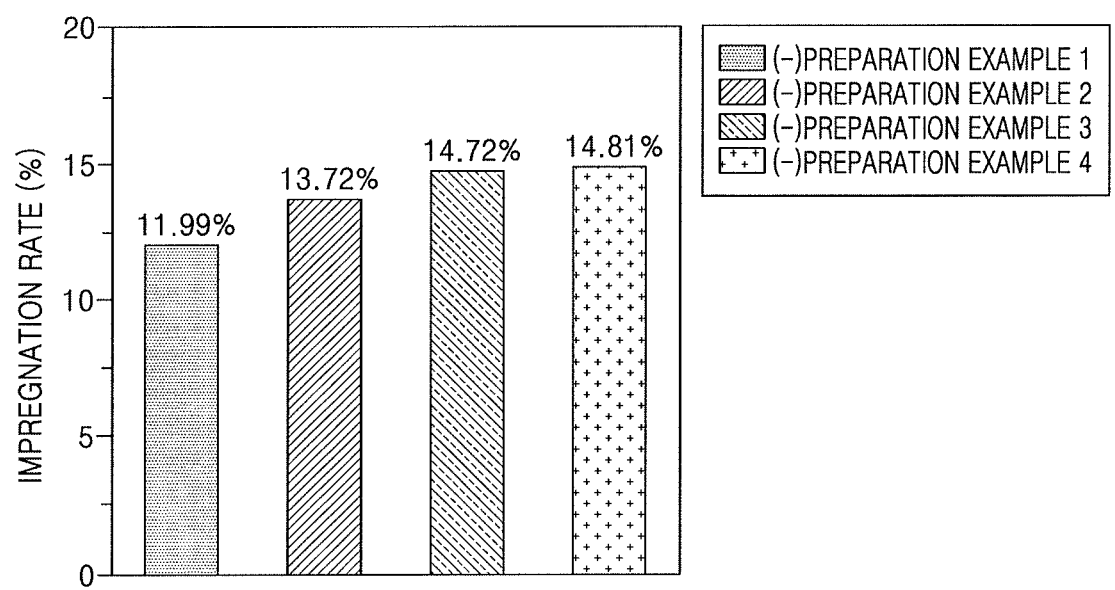
FIG. 4 illustrates a bar graph of the electrolyte impregnation rate for the electrodes of Preparation Examples 1 to 4.

Referring to FIG. 4, when the width of the concave portion was 15 μm (Preparation Example 2), the impregnation rate of the electrolyte was improved by about 2% as compared with control group (electrode of Preparation Example 1), and when the width of the concave portion is 20 μm or more (Preparation Examples 3 and 4), the impregnation rate of the electrolyte was not greatly changed. For example, when the width of the concave portion is 15 μm or more, the impregnation rate of the electrolyte may be improved.

(2) Evaluation of Discharge Rate (Manufacture of Half Cell)

EXAMPLE 1

The electrode manufactured in Preparation Example 2 was used as a working electrode, a lithium metal was used as a counter electrode, a separator was disposed between the working electrode and the counter electrode, and a liquid electrolyte was injected to manufacture a half cell.

EXAMPLES 2 and 3

Half cells were manufactured in the same manner as in Example 1, except that the electrodes manufactured in Preparation Examples 3 and 4 were used instead of the electrode manufactured in Preparation Example 2.

Figure 5:
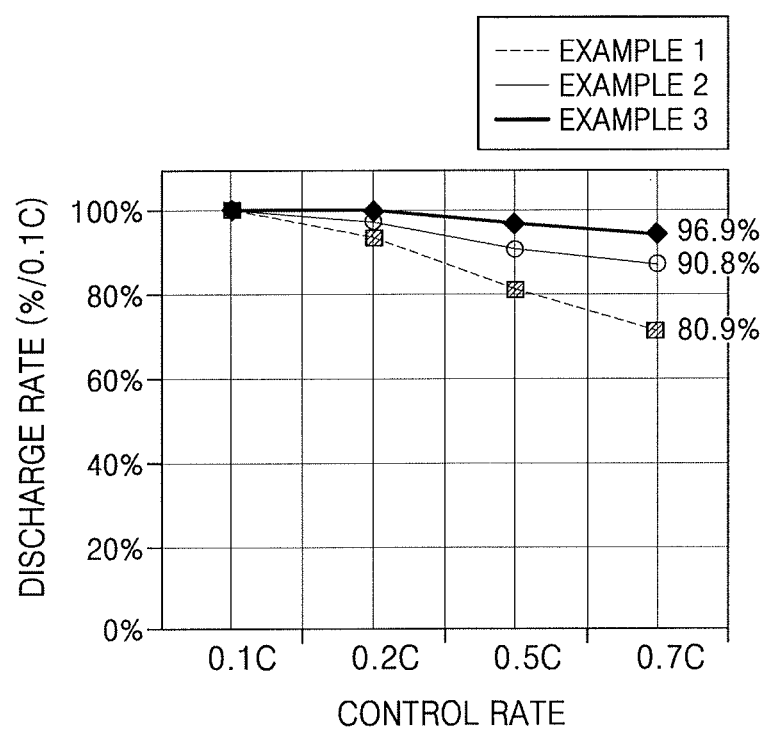
FIG. 5 illustrates a graph of the discharge rates of the half cells of Examples 1 to 3 according to rate control.

The half cell manufactured in Example 1 was charged and discharged at 0.1 C once at 25° C., and a reference discharge capacity was measured. The half cell manufactured in Example 1 was charged and discharged at 0.2 C once at 25° C., charged and discharged at 0.5 C once at 25° C., and charged and discharged at 0.7 C once at 25° C., and reference discharge capacities were measured, respectively. Subsequently, the change rate of each discharge capacity with respect to the reference discharge capacity was calculated. The change rate in discharge capacity was calculated in the same manner for the half cells manufactured in Examples 2 to 3. The results thereof are shown in FIG. 5. Referring to FIG. 5, as the width of the concave portion increases, it may be seen that the capacity retention rate at high rate is high. This is considered to be because the impregnation is improved as the width of the concave portion increases, and as a result, ionic conductivity is improved.

(Evaluation of Characteristics According to the Shape of the Concave Portion of the First Active Material Layer)

After each of the electrodes manufactured in Preparation Example 1 and Preparation Examples 5 to 7 was cut using a pole plate punching machine (5×5 cm$^2$), a difference in weight between before and after cutting, and a rate at which an active material was desorbed from an electrode was calculated.

Figure 6:
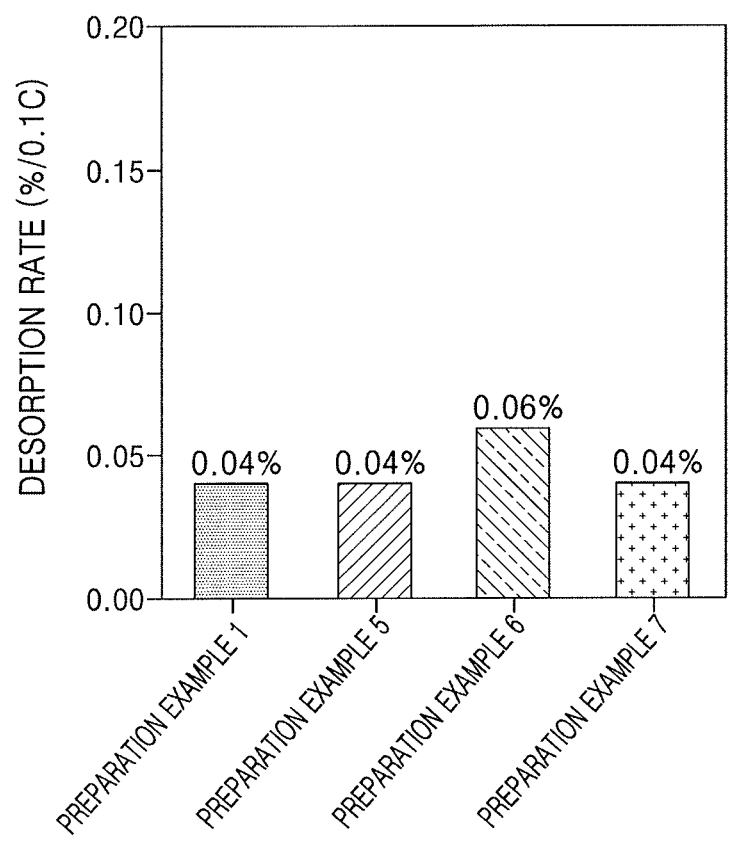
FIG. 6 illustrates a bar graph of the active material desorption rates of the electrodes of Preparation Example 1 and Preparation Examples 5 to 7.

The results thereof are shown in FIG. 6. Referring to FIG. 6, it may be seen that the desorption rate of an active material was highest when the first active material layer had a circular concave portion (Preparation Example 6, in which the cross section thereof was rectangular). Further, it may be seen that the desorption rate of an active material was good when the first active material layer had a conical concave portion (Preparation Example 5, in which the cross section thereof was triangular) and a truncated conical concave portion (Preparation Example 7, in which the cross section thereof was trapezoidal).

(Evaluation of Characteristics According to the Content of Binder)

(1) Evaluation of Adhesion

Figure 7:
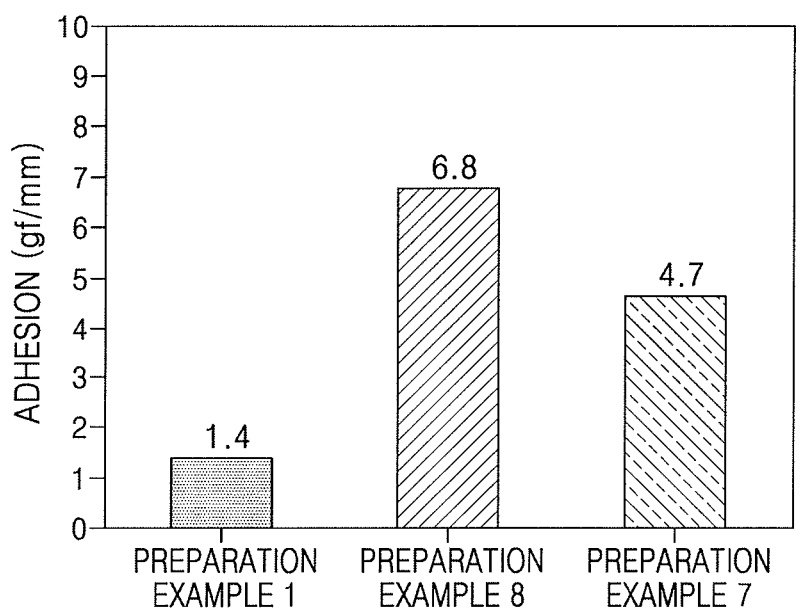
FIG. 7 illustrates a bar graph of the adhesion of the electrodes of Preparation Example 1, Preparation Example 8, and Preparation Example 7.

The surface of each of the electrodes manufactured in Preparation Example 1, Preparation Example 8, and Preparation Example 7 was cut and fixed on a slide glass, and then 180° peel strength was measured while peeling a current collector. The results thereof shown in FIG. 7. Referring to FIG. 7, the adhesion of the electrodes of Preparation Examples 8 and 7 (which included double active material layers) was remarkably improved, as compared with the adhesion of the electrode of Preparation Example 1 (which included only a single active material layer), and was remarkably improved as compared with the adhesion of the electrode of Preparation Example 1 even when the ratio of the binder was 5:5 and 3:7. This is considered to be an effect of increasing the content ratio of the binder in the active material layer (e.g., the first active material layer) adjacent to the current collector based on the total content of the binder.

(2) Evaluation of Desorption of Active Material

After each of the electrodes manufactured in Preparation Example 1, Preparation Example 8, and Preparation Example 7 was cut using a pole plate punching machine (5×5 cm$^2$), a difference in weight between before and after cutting, and a rate at which an active material was desorbed from an electrode was calculated.

Figure 8:
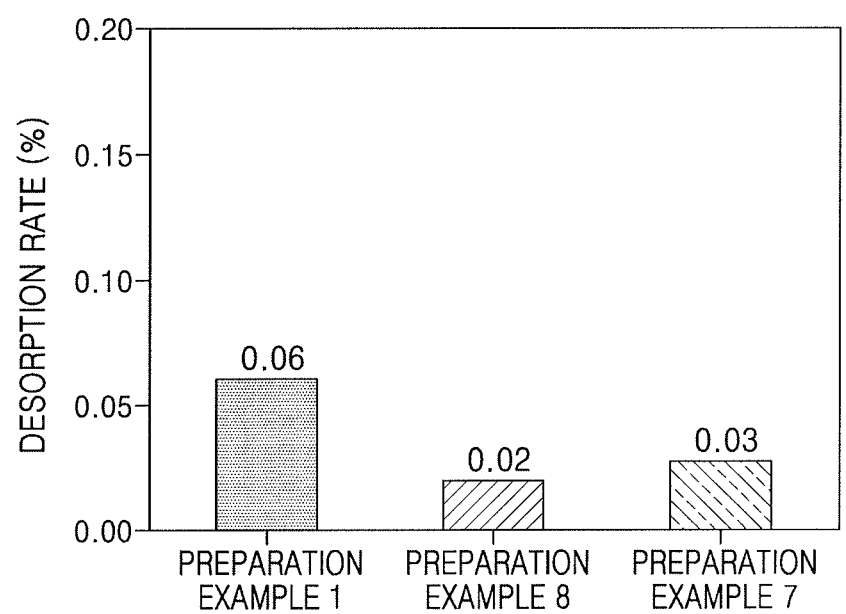
FIG. 8 illustrates a bar graph of the active material desorption rates of the electrodes of Preparation Example 1, Preparation Example 8, and Preparation Example 7.

The results thereof are shown in FIG. 8. Referring to FIG. 8, it may be seen that the desorption rate of an active material in the electrodes of Preparation Examples 8 and 7 (which included double active material layers) was reduced by 50% or more as compared with the electrode of Preparation Example 1 (which included only a single active material layer).

(3) Evaluation of Discharge Rate (Manufacture of Half Cell)

EXAMPLE 4

The electrode manufactured in Preparation Example 8 was used as a working electrode, a lithium metal was used as a counter electrode, a separator was disposed between the working electrode and the counter electrode, and a liquid electrolyte was injected to manufacture a half cell.

EXAMPLES 5 and 6

Half cells were manufactured in the same manner as in Example 4, except that the electrodes manufactured in Preparation Examples 7 and 9 were used instead of the electrode manufactured in Preparation Example 8.

COMPARATIVE EXAMPLE 1

A half cell was manufactured in the same manner as in Example 4, except that the electrode manufactured in Preparation Example 1 was used instead of the electrode manufactured in Preparation Example 8.

Figure 9:
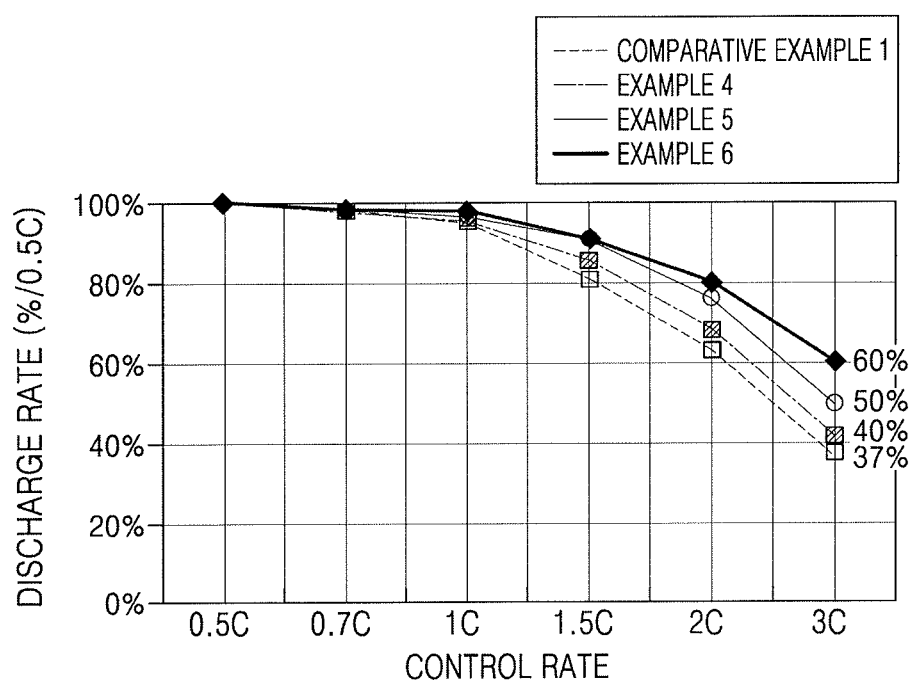
FIG. 9 illustrates a graph of the discharge rates of the half cells of Examples 4 to 6 and Comparative Example 1 according to rate control.

The half cell manufactured in Example 4 was charged and discharged at 0.5 C once at 25° C., and a reference discharge capacity was measured. The half cell manufactured in Example 4 was charged and discharged at 0.7 C once at 25° C., charged and discharged at 1 C once at 25° C., charged and discharged at 1.5 C once at 25° C., charged and discharged at 2 C once at 25° C., and charged and discharged at 3 C once at 25° C., and reference discharge capacities were measured, respectively. Subsequently, the change rate of each discharge capacity with respect to the reference discharge capacity was calculated. The change rate in discharge capacity was calculated in the same manner for the half cells manufactured in Examples 5 and 6 and Comparative Example 1. The results thereof are shown in FIG. 9. Referring to FIG. 9, when the ratios of the binder included in the first active material layer and the second active material layer were 7:3 (Example 5), 5:5 (Example 4), and 9:1 (Example 6), respectively, rate control characteristics thereof were excellent as compared with the electrode (Comparative Example 1) having a single active material layer. This is considered to be because an increase in resistance by the binder is suppressed by controlling the content of the binder to be low at the interface between the electrode and the electrolyte.

By way of summation and review, each of the cathode and the anode may be formed by mixing an active material, a binder, and a solvent to obtain an active material slurry, applying the active material slurry to the surface of a current collector and then drying the applied active material slurry. In the process of drying the active material slurry, the binder could move toward an electrode interface by binder migration. As a result, adhesion between the current collector and the active material layer could decrease, resistance on the upper interface of the active material layer could increase, the electrodes could deteriorate, and battery characteristics at a high rate could deteriorate.

In order to address the above issue, a method of controlling the conditions of the drying process has been considered.

One or more embodiments may provide an electrode capable of increasing adhesion between an active material layer and a conductive substrate and decreasing resistance on the outer interface of the active material layer.

According to an embodiment, an electrode may include a plurality of active material layers arranged in a conductive substrate, the first active material layer or the second active material layer may include a convex portion and a concave portion having a triangular or trapezoidal cross section, thereby improving adhesion between the first active material layer and the conductive substrate, reducing the interfacial resistance of the electrode and improving the ionic conductivity according to an increase in impregnating ability of the electrolyte.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrode, comprising:
a conductive substrate; and
a plurality of active material layers on the conductive substrate,
wherein:
the plurality of active material layers includes a first active material layer and a second active material layer;
the first active material layer is on the substrate,
the second active material layer is on the first active material layer;
the first active material layer includes a first active material and a first binder;
the second active material includes a second active material and a second binder;
the first active material layer or the second active material layer includes convex portions and concave portions,
the concave portions have a triangular cross section or a trapezoidal cross section in a plane perpendicular to a surface of the electrode, and
the convex portions are spaced apart from each other at intervals of about 15 µm to about 100 µm.

2. The electrode as claimed in claim 1, wherein the substrate directly contacts the first active material layer.

3. The electrode as claimed in claim 1, wherein the first active material layer directly contacts the second active material layer.

4. The electrode as claimed in claim 1, wherein the convex portions and the concave portions are between the first active material layer and the second active material layer.

5. The electrode as claimed in claim 1, wherein the first active material layer is completely covered by the second active material layer.

6. The electrode as claimed in claim 1, wherein the plurality of active material layers includes the first binder and the second binder in an amount of about 1.0 wt % to 2.0 wt %, based on a total weight of the first active material layer and the second active material layer.

7. The electrode as claimed in claim 1, wherein the plurality of active material layers includes the first binder in an amount that is higher than an amount of the second binder.

8. The electrode as claimed in claim 1, wherein a weight ratio of the first binder and the second binder is 50:50 to 90:10.

9. The electrode as claimed in claim 1, wherein the first active material is the same as the second active material.

10. The electrode as claimed in claim 1, wherein the first active material is different from the second active material.

11. The electrode as claimed in claim 1, wherein the first binder is the same as the second binder.

12. The electrode as claimed in claim 1, wherein the first binder is different from the second binder.

13. A secondary battery comprising the electrode as claimed in claim 1.

* * * * *